(12) United States Patent
Zlotnicki

(10) Patent No.: US 9,152,241 B2
(45) Date of Patent: *Oct. 6, 2015

(54) METHOD AND APPARATUS FOR EFFICIENT DATA INPUT

(75) Inventor: Joseph Zlotnicki, Downers Grove, IL (US)

(73) Assignee: Zienon, LLC, Rolling Meadows, IL (US)

(*) Notice: Subject to any disclaimer, the term of this patent is extended or adjusted under 35 U.S.C. 154(b) by 1069 days.

This patent is subject to a terminal disclaimer.

(21) Appl. No.: 11/789,853

(22) Filed: Apr. 26, 2007

(65) Prior Publication Data

US 2007/0252818 A1 Nov. 1, 2007

Related U.S. Application Data

(60) Provisional application No. 60/795,830, filed on Apr. 28, 2006.

(51) Int. Cl.
  G06F 3/02 (2006.01)
  G06F 3/023 (2006.01)
  G06F 3/0489 (2013.01)

(52) U.S. Cl.
  CPC ............ G06F 3/0237 (2013.01); G06F 3/0238 (2013.01); G06F 3/04895 (2013.01)

(58) Field of Classification Search
  CPC ... G06F 3/0233; G06F 3/0426; G06F 3/0219; G06F 3/0235; G06F 3/0237; G06F 1/1673
  USPC ............ 345/156, 168, 169, 172, 173; 341/20, 341/22, 28; 382/181, 182, 185; 715/764, 715/771, 772, 773, 810, 811
  See application file for complete search history.

(56) References Cited

U.S. PATENT DOCUMENTS 4,988,981 A * 1/1991 Zimmerman et al. ........ 345/158
5,025,705 A  6/1991 Raskin
(Continued)

FOREIGN PATENT DOCUMENTS

EP  0489792  3/1994
WO  96/02394  2/1996
(Continued)

OTHER PUBLICATIONS

MacKenzi, I.S., & Soukoreff, R.W. (2002); Text Entry for Mobile Computing: Model and Methods, Theory and Practice. Human Computer Interaction, 17, 147-198.
(Continued)

Primary Examiner — Dorothy Harris
(74) Attorney, Agent, or Firm — Joseph A. Fuchs; Nixon Peabody LLP

(57) ABSTRACT

Visual and/or audible cues are used to assist users with data input on keyboards having keys associated with multiple input symbols or functions. Each input symbol or function has a correspondence to an input object, such as a finger. During key actuation, one or more input objects are detected. Candidate input symbols or functions are determined based on identification of the key being actuated. The candidate input symbols or functions are presented to the user in the form of cues having visual and/or audible features. The detected input objects may be optionally identified and presented to the user in the form of cues having visual and/or audible features as well.

18 Claims, 6 Drawing Sheets

(56) References Cited

U.S. PATENT DOCUMENTS

| | | | |
|---|---|---|---|
| 5,168,531 A | 12/1992 | Sigel | |
| 5,245,559 A | 9/1993 | Lapeyre | |
| 5,581,484 A * | 12/1996 | Prince | 702/150 |
| 5,767,842 A * | 6/1998 | Korth | 345/168 |
| 5,790,103 A | 8/1998 | Willner | |
| 5,793,312 A | 8/1998 | Tsubai | |
| 5,825,352 A | 10/1998 | Bisset et al. | |
| 5,841,374 A | 11/1998 | Abraham | |
| 5,973,621 A | 10/1999 | Levy | |
| 5,982,302 A | 11/1999 | Ure | |
| 6,011,554 A * | 1/2000 | King et al. | 715/811 |
| 6,087,577 A * | 7/2000 | Yahata et al. | 84/478 |
| 6,102,594 A | 8/2000 | Strøm | |
| 6,204,848 B1 * | 3/2001 | Nowlan et al. | 715/810 |
| 6,208,330 B1 | 3/2001 | Hasegawa et al. | |
| 6,232,960 B1 * | 5/2001 | Goldman | 345/168 |
| 6,307,549 B1 * | 10/2001 | King et al. | 715/810 |
| 6,348,878 B1 | 2/2002 | Tsubai | |
| 6,356,258 B1 * | 3/2002 | Kato et al. | 345/168 |
| 6,407,679 B1 * | 6/2002 | Evans et al. | 341/20 |
| 6,512,838 B1 * | 1/2003 | Rafii et al. | 382/106 |
| 6,542,091 B1 * | 4/2003 | Rasanen | 341/22 |
| 6,593,914 B1 * | 7/2003 | Nuovo et al. | 345/169 |
| 6,611,252 B1 | 8/2003 | DuFaux | |
| 6,611,253 B1 * | 8/2003 | Cohen | 345/168 |
| 6,614,422 B1 | 9/2003 | Rafii et al. | |
| 6,654,484 B2 * | 11/2003 | Topping | 382/124 |
| 6,670,894 B2 | 12/2003 | Mehring | |
| 6,690,618 B2 | 2/2004 | Tomasi et al. | |
| 6,710,770 B2 * | 3/2004 | Tomasi et al. | 345/168 |
| 6,885,317 B1 * | 4/2005 | Gutowitz | 341/22 |
| 7,016,711 B2 | 3/2006 | Kurakane | |
| 7,020,270 B1 | 3/2006 | Ghassabian | |
| 7,088,340 B2 * | 8/2006 | Kato | 345/168 |
| 7,151,530 B2 | 12/2006 | Roeber et al. | |
| 7,199,786 B2 * | 4/2007 | Suraqui | 345/168 |
| 7,439,957 B2 | 10/2008 | Chu et al. | |
| 7,530,031 B2 * | 5/2009 | Iwamura et al. | 715/864 |
| 7,555,732 B2 | 6/2009 | Van der Hoeven | |
| 7,725,511 B2 * | 5/2010 | Kadi | 708/145 |
| RE43,082 E * | 1/2012 | Gutowitz | 341/22 |
| 2002/0021287 A1 | 2/2002 | Tomasi et al. | |
| 2002/0140582 A1 * | 10/2002 | Ye | 341/22 |
| 2002/0163506 A1 * | 11/2002 | Matusis | 345/173 |
| 2002/0171633 A1 | 11/2002 | Brinjes | |
| 2002/0180698 A1 | 12/2002 | Kaelbling | |
| 2003/0043118 A1 | 3/2003 | Lee | |
| 2003/0048260 A1 * | 3/2003 | Matusis | 345/173 |
| 2003/0063775 A1 | 4/2003 | Rafii et al. | |
| 2003/0179185 A1 * | 9/2003 | Iwamura et al. | 345/168 |
| 2003/0193478 A1 * | 10/2003 | Ng et al. | 345/168 |
| 2004/0032398 A1 * | 2/2004 | Ariel et al. | 345/168 |
| 2004/0046744 A1 | 3/2004 | Rafii et al. | |
| 2004/0169635 A1 | 9/2004 | Ghassabian | |
| 2004/0179001 A1 | 9/2004 | Morrison et al. | |
| 2004/0196268 A1 | 10/2004 | Hsu et al. | |
| 2004/0242988 A1 | 12/2004 | Niwa et al. | |
| 2004/0263473 A1 | 12/2004 | Cho et al. | |
| 2005/0024338 A1 * | 2/2005 | Ye | 345/168 |
| 2005/0225538 A1 * | 10/2005 | Verhaegh | 345/173 |
| 2005/0253814 A1 * | 11/2005 | Ghassabian | 345/168 |
| 2006/0028358 A1 | 2/2006 | Bollman | |
| 2006/0028450 A1 | 2/2006 | Suraqui | |
| 2006/0114233 A1 * | 6/2006 | Radivojevic et al. | 345/168 |
| 2006/0132447 A1 | 6/2006 | Conrad | |
| 2006/0190836 A1 | 8/2006 | Ling Su et al. | |
| 2006/0282791 A1 | 12/2006 | Bogomolov et al. | |
| 2007/0035521 A1 | 2/2007 | Jui et al. | |
| 2008/0300010 A1 | 12/2008 | Border et al. | |
| 2009/0183098 A1 | 7/2009 | Casparian et al. | |
| 2010/0231522 A1 * | 9/2010 | Li | 345/169 |

FOREIGN PATENT DOCUMENTS

| | | |
|---|---|---|
| WO | 01/59558 | 8/2001 |
| WO | 01/59975 | 8/2001 |
| WO | 02/10896 | 2/2002 |
| WO | 03/046706 | 6/2003 |
| WO | 03/050795 | 6/2003 |
| WO | 2009/059479 | 5/2009 |
| WO | WO 2009/059479 A | 5/2009 |

OTHER PUBLICATIONS

Roos, Gina, Fingerprint Sensor Touts Security, Navigation, and Personalization for Cell Phones; Nov. 2004.

* cited by examiner

METHOD AND APPARATUS FOR EFFICIENT DATA INPUT

CROSS REFERENCE TO RELATED APPLICATION

This application claims priority to U.S. provisional patent application Ser. No. 60/795,830, filed on Apr. 28, 2006, the disclosure of which is incorporated herein by reference in its entirety and made a part hereof.

FIELD OF THE INVENTION

The present invention relates in general to the field of data entry, and in particular, to methods and apparatus for assisting user input in a data entry device enabled with Tapping Finger Identification (TFI) technology.

BACKGROUND OF THE INVENTION

The Tapping Finger Identification (TFI) technology disclosed in US patent application, US20060190836A1, by Su et al., presents alternative means to data entry on conventional keyboards. TFI-enabled keyboards determine user input not only based on which key was pressed, but also on which of the user's finger was used to press the key, as each key may be capable of selecting multiple symbols or functions.

The use of visual or audible cues to improve the accuracy and ease of use of data entry interfaces has been proposed for some systems. This is especially important for virtual keyboards, such as those keyboard systems proposed in U.S. Pat. No. 5,767,842 (Korth) and U.S. Pat. No. 7,151,530 (Rafii). These include: displaying key layout on-screen, indicating hand status on-screen, and using audible sound to indicate key press events.

However, all these solutions are designed for traditional keyboard systems in which the various tapping fingers are not considered or differentiated in such designs. In TFI, it is important to not only indicate by visual and/or audible cues what keys are pressed, but also which fingers are being (or about to be) used in actuating keys.

DETAILED DESCRIPTION OF THE PREFERRED EMBODIMENT

Methods and apparatus for providing users with visual and/or audible cues to assist in their data entry on devices enabled with Tapping Finger Identification (TFI) technology are provided. Various exemplary embodiments of visual and/or audible cues applicable to input using TFI technology are described.

Figure 1A:
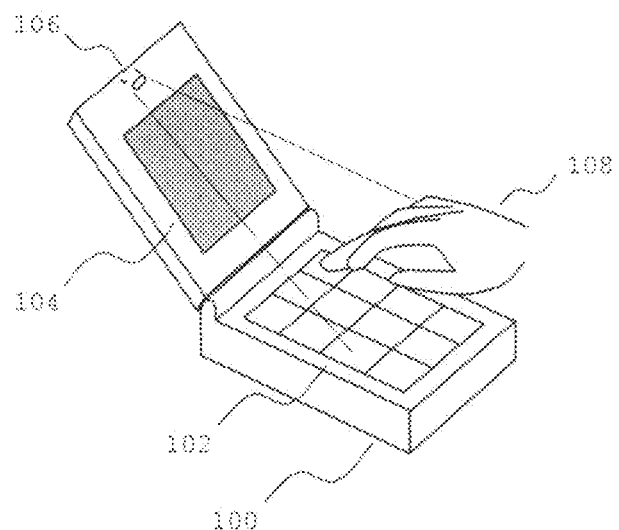
FIG. 1A illustrates a TFI-enabled data entry device with a telephone-style keypad and an output screen.

To permit a better understanding of how the visual and/or audible cues affect user behavior, the operation of several TFI-enabled devices is first described. FIG. 1A illustrates one example of a TFI-enabled data entry device 100 having an input unit comprising a TFI-enabled telephone-style keypad 102, and an output unit having a display screen 104. Device 100 may be equipped with other or additional output units (not shown), such as a speaker system for audio output. The input unit may include additional components, such as an optical sensor 106 (e.g., a video camera), that may be used to detect and/or identify fingers or other objects used to actuate keys on keypad 102. FIG. 1A also shows the middle finger of a user's right hand 108 actuating the number "3" key (key 110 in FIG. 1B). The telephone-style keypad 102 is shown with greater detail in FIG. 1B.

Figure 1B:
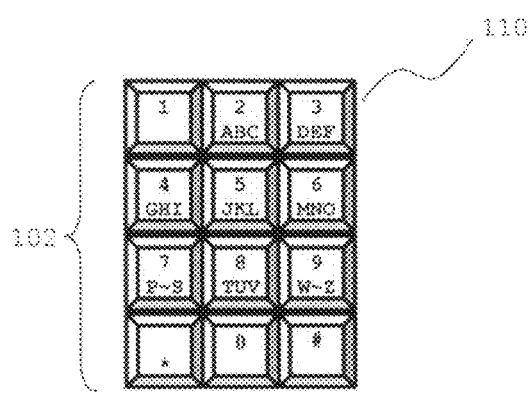
FIG. 1B illustrates the telephone-style keypad of the TFI-enabled data entry device in FIG. 1A.

In alphabetic input mode, each of the keys numbered "2" to "9" on keypad 102 in FIG. 1B may be used to enter one of three or four letters with a single keystroke, depending on which finger is identified as the actuating object. For example, a user may assign his index, middle, and ring fingers to correspond to the letters "D", "E", and "F" on the number "3" key 110, respectively. Thus, the letter "D" is input if the index finger is used to actuate the number "3" key 110. Similarly, "E" is input if the middle finger is used, and "F" is input if the ring finger is used. Precisely where the key 110 is struck does not matter, since it is the tapping finger that determines the input symbol.

Figure 2:
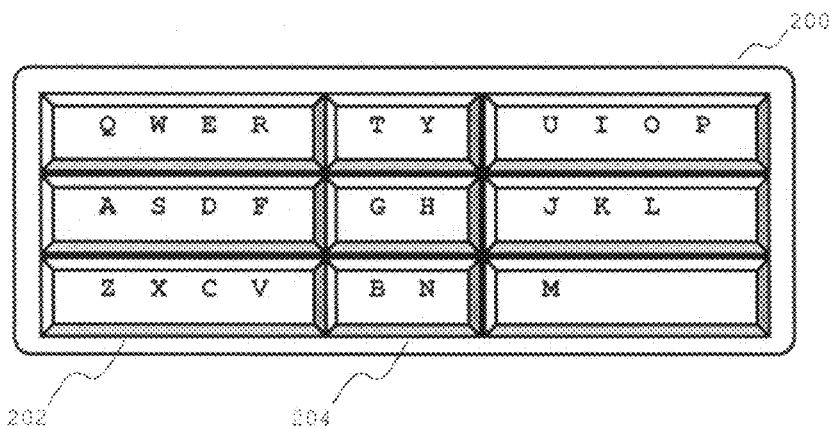
FIG. 2 illustrates a basic TFI-enabled QWERTY keyboard.

As a second example, FIG. 2 shows a QWERTY keyboard 200 of a TFI-enabled data entry device. Such an input unit may include additional components (not shown) that may be used to detect and/or identify fingers or other objects used to actuate keys on keyboard 200. For simplicity, only the keys associated with alphabetic symbols are shown. In each keystroke, users select one of multiple symbols on a key for input by tapping the key with an assigned finger corresponding to that symbol. For instance, the letter "Z" may be input if the left little finger is used to actuate the lower left key 202 in keyboard 200. Correspondingly, the left ring finger actuating the same key may input the letter "X", while the left middle finger may input the letter "C", and the left index finger may input the letter "V". Similarly, the letter "B" may be input with the left index finger actuating the lower middle key 204, and the letter "N" may be input with the right index finger tapping the same key. Again, exactly where on the keys a typing finger taps does not matter, as the input symbol selection is based on the particular finger used in key actuation.

Unlike conventional keyboards having keys that are of mechanical construction or are simulated on touch-sensitive regions (e.g., touch screens), basic TFI-enabled keyboards such as those shown in FIGS. 1A and 2 typically require one or more sensors to detect and/or identify actuating objects in addition to the mechanical or touch-sensitive keys that identify the keystroke.

Figure 3:
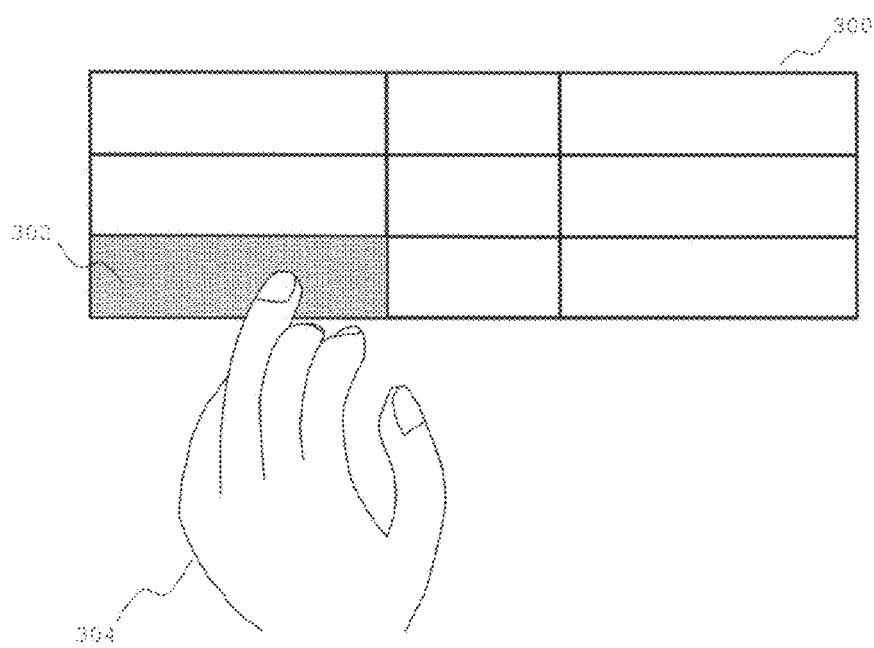
FIG. 3 illustrates a virtual TFI-enabled QWERTY keyboard.

Another example of a TFI-enabled keyboard is the virtual QWERTY keyboard 300 depicted in FIG. 3, which is identical in operation to keyboard 200 in FIG. 2. In FIG. 3, keyboard 300 may have only a portion of a device's input unit. For simplicity reasons, other components of the input unit are not shown in FIG. 3. In virtual TFI-enabled keyboards, there are no mechanical or touch-sensitive keys since one or more optical sensors are generally used to detect, and possibly identify, both the tapping finger (or other actuating objects) and the actuated key. The keys in this case are simply regions in two-dimensional space, such as region 302, with markings to serve as guides that indicate boundaries of the key regions. In many existing virtual keyboards, the markings are generated by projecting one or more lasers onto a surface. Also shown in FIG. 3 is a ring finger of a user's left hand 304 actuating key region 302.

Since the functionality of virtual keyboard 300 is identical to that of keyboard 200, their key arrangements are the same as well. Thus, for example, tapping anywhere in the region 302 with the ring finger of the user's left hand 304 is equivalent to actuating key 202 in FIG. 2 with the same finger, producing "X" as the input symbol. The symbol labels in the virtual keyboard 300 may be eliminated, as conventional touch typists know which fingers correspond to which input symbols in a particular key region due to muscle memory.

Based on the foregoing description, the term "key region" may be used hereafter to refer to regions to which one or more symbols or functions have been assigned such that when a finger or some other input object with identifiable feature(s) is detected as actuating or making contact with the region, an assigned symbol or function of the region will be selected as user input. Some examples of key regions include, but are not limited to: discrete mechanical keys, software configured simulated keys on touch screens or touch pads, and virtual key regions comprising some location in two-dimensional or three-dimensional space. It is understood that the surface of an actual discrete key may be considered a key region or a portion thereof.

Figure 4:
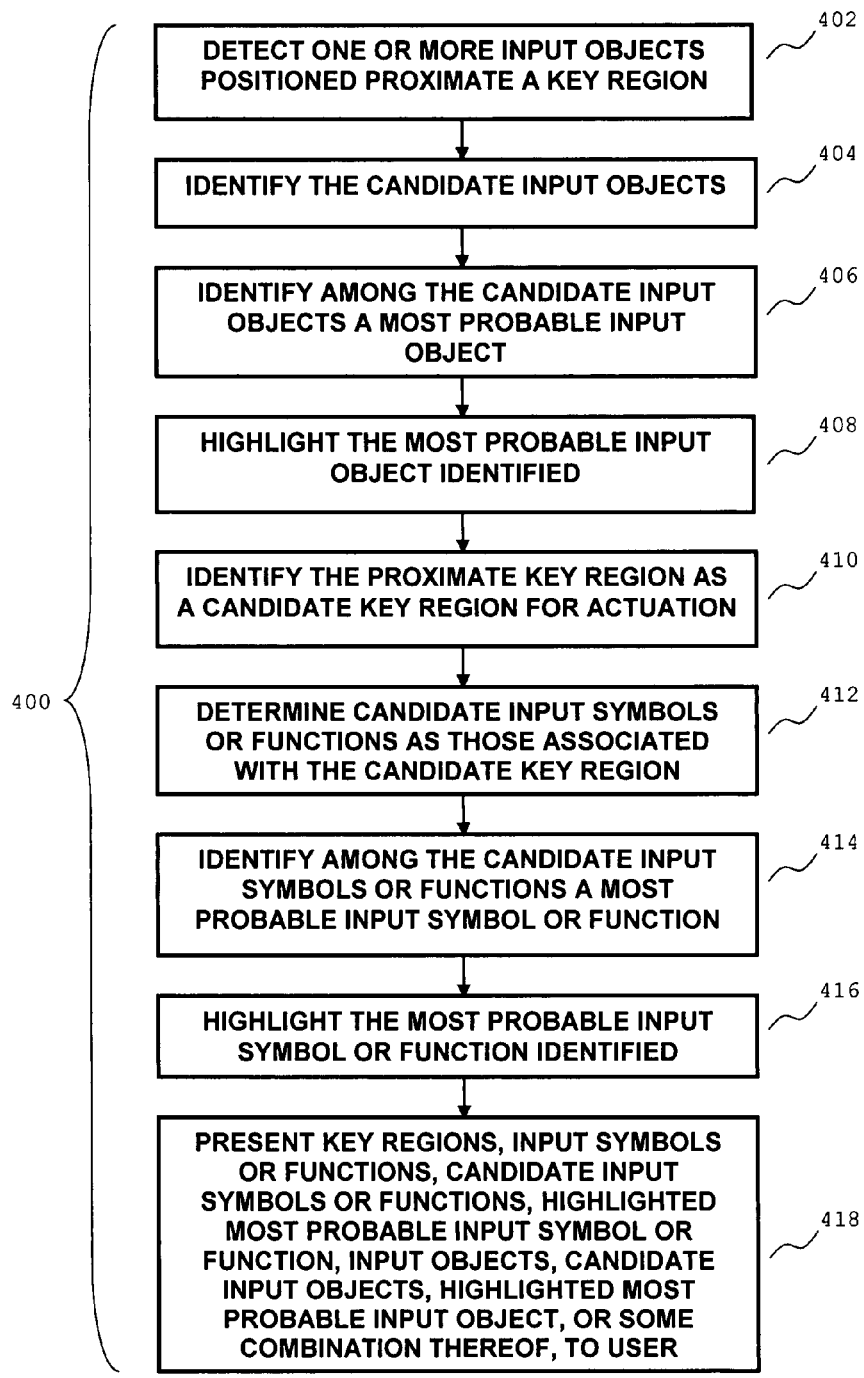
FIG. 4 illustrates a flow diagram that summarizes the typical process of generating visual and/or audible cues for assisting users during data entry.

The visual and/or audible cues used to assist users of TFI-enabled devices during input may be generated according to process 400 as summarized in the flowchart of FIG. 4. In the exemplary embodiments of cues to be subsequently described, it will be become apparent that many of the steps in process 400 are optional.

With continuing reference to FIG. 4, one or more input objects utilized by a user in actuating (or about to actuate) a key region are detected in step 402. Such input objects may include any combination of the individual possible input objects (e.g., fingers) used to actuate the key region. Since the key region is associated with multiple input symbols or functions, each input symbol or function typically has a correspondence to an input object. Examples of input objects include, but are not limited to, the fingers of a user's hand(s), styluses having various colors, and styluses having various tips, just to name a few. The set of possible input objects detected may be referred to hereafter as "candidate input objects". Step 402 may be required in some embodiments while not in others.

The detection of candidate input objects in step 402 may be achieved using one or more proximity object detection sensors capable of detecting input objects coming within close range of a key region. For example, US Pat. App. No. US20060190836A1 (Su et al.) teaches the use of active sensors that detect the presence of nearby objects by measuring feedback from the reference signals (e.g., infrared signals) that they emit. Alternatively, U.S. Pat. No. 5,767,842 (Korth) discloses methods for detecting keystroke events, which utilize optical sensors such as sensor 106 in FIG. 1 to monitor the motion of a user's hands. Similarly, many of the existing methods proposed for hand gesture recognition may be used to detect input objects in the actuation of key regions.

In step 404 of process 400, the candidate input objects may be identified, as desired in some embodiments. The identification of the candidate input objects may be achieved, for example, through the extraction and matching of various features of the input objects, in accordance with the teachings of US Pat. App. No. US20060190836A1 (Su et al.).

In step 406 of process 400, the most probable input object, defined as the input object that is about to actuate the aforementioned key region, is identified among the candidate input objects. Identification of the most probable input object among the candidate input objects may be accomplished, for example, using the proximity object detection sensors mentioned in step 402. The input object detected as being in closest range or proximity of a key region as compared to the other input objects is identified as the most probable input object. Performing step 406 may be desirable in some embodiments while not necessary in others.

Furthermore, the most probable input object as identified in step 406 may be highlighted among the candidate input objects, if desired, in step 408. As will be apparent in the subsequent description of exemplary embodiments of cues, highlighting an input object herein refers to representing that input object with unique visual and/or audible features such that it can be readily differentiated from the visual and/or audible features representing the remaining candidate input objects. The aforementioned unique visual and/or audible features may be referred to hereafter as "differentiating" features.

Step 410 of process 400, if performed, identifies the candidate key region for actuation. The candidate key region may be identified, for example, using the same optical sensor(s) (e.g., sensor 106 in FIG. 1) that are used to monitor the motion of input objects in order to detect keystroke events, as disclosed in U.S. Pat. No. 5,767,842 (Korth). Typically, the candidate key region is the region that is in closest proximity to the candidate input objects detected in step 402.

Once the candidate key region is known, the candidates for the input symbol or function may be optionally determined in step 412 of process 400. The candidate input symbols or functions can be easily determined since they are the input symbols or functions associated with the candidate key region, as identified in step 410.

Among the candidate input symbols or functions determined in step 412, the most probable input symbol or function may be optionally identified in step 414. The most probable input symbol or function is identified as that symbol or function having a correspondence to the most probable input object, as identified in step 406.

The most probable input symbol or function as identified in step 414 may be highlighted among the candidate input symbols or functions, if desired, in step 416 of process 400. As will be apparent in the subsequent description of exemplary embodiments of cues, highlighting an input symbol or function herein refers to representing that input symbol or function with unique visual and/or audible features such that it can be readily differentiated from the visual and/or audible features representing the remaining candidate input symbols or functions. The aforementioned unique visual and/or audible features may be referred to hereafter as "differentiating" features.

In step 418 of process 400, the key regions, the input symbols or functions associated with the key regions, the candidate input symbols or functions identified in step 412, the most probable input symbol or function highlighted in step 416, the candidate input objects identified in step 404, the most probable input object highlighted in step 408, or some combination thereof, are assembled in some fashion and presented to the user in the form of cues having visual and/or audible features that are distinguishable by the user. Examples of such user-distinguishable features are provided in the subsequent description of exemplary embodiments of cues.

Those skilled in the art will recognize that the order of some of the steps presented in process 400 of FIG. 4 is not necessarily critical in many instances and they will further recognize that some of these steps may be eliminated or combined with one another in ways as well if desired. For example, steps 404, 406, and 408 may be performed after step 412 and before step 414.

In the following description with respect to exemplary embodiments, means of providing users with visual and/or audible cues that assist them in inputting data on a TFI-enabled keyboards are provided.

Figure 5A:
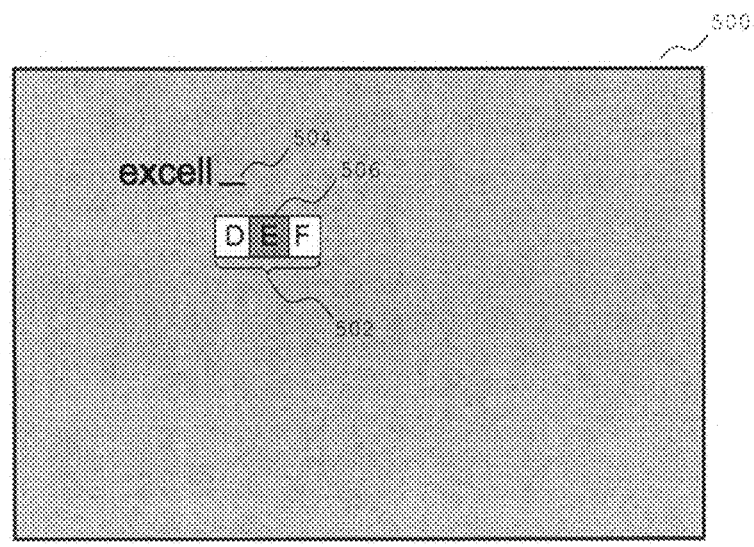
FIG. 5A shows an exemplary embodiment of visual cues for assisting users in operating keyboards enabled with TFI technology.
Figure 5B:
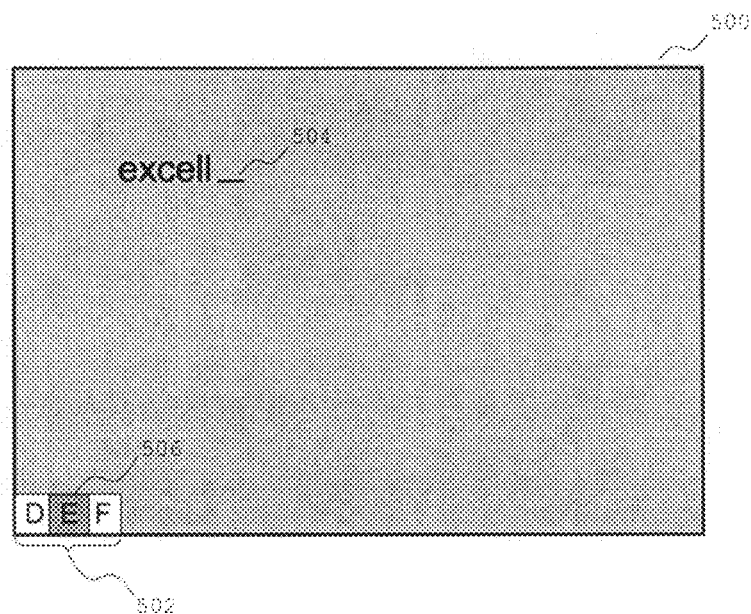
FIG. 5B shows a variation of the exemplary embodiment of FIG. 5A.

In one exemplary embodiment of visual cues, shown in FIGS. 5A and 5B, visual cues that contain candidate input symbols or functions are presented to a user, in accordance with steps 402, 410, 412 and 418 of process 400 (FIG. 4). Illustrated in FIGS. 5A and 5B is an output screen 500, such as screen 104 of FIG. 1A, containing visual cues in the form of a suggestion frame 502 that is presented to a user whose right middle finger comes sufficiently close to making contact with the number "3" key 103 (FIG. 1B) in an attempt to input the letter "E". In the suggestion frame 502, the candidate input symbols "D", "E", and "F" associated with the number "3" key 103 are shown. The most probable input symbol "E" 506, corresponding to the most probable input finger (the user's right middle finger) identified, may be optionally shaded to indicate highlighting, in accordance with steps 414 and 416 of process 400. If, instead, the letter "D" were the most probable input symbol, then "D" alone would appear shaded in suggestion frame 502. Besides shading, other differentiating features for highlighting the most probable input symbol include, but are not limited to: displaying that symbol in bold and/or italics font, displaying that symbol as flashing text, and displaying that symbol in a font size different from the remaining candidate input symbols, just to name a few. Alternatively, the suggestion frame 502 may display only the symbol "E" 506 as a means of highlighting the most probable input symbol. The respective alphabets appearing in suggestion frame 502 make up the user-distinguishable features used in presenting the candidate input symbols to the user.

With continuing reference to FIG. 5A, the suggestion frame 502 may dynamically appear in the vicinity of a data entry cursor 504 as the user enters data. In a similar exemplary embodiment, depicted in FIG. 5B, suggestion frame 502 may appear in any predetermined location, such as the lower left hand corner in screen 500, that does not interfere with the display of output data. The precise manner in which the visual cues are to be presented to the user may be configured by the user. Users may also switch the cueing feature on or off as desired.

It is apparent from the exemplary embodiments above that visual cues provide users with instantaneous information feedback regarding the position of their typing hands and fingers relative to the keyboard. This can be especially helpful on some TFI-enabled input devices, such as the telephone-style keypad 102 in FIG. 1B, where the typing hand must offset its position in order to input different symbols or functions on the same key because different fingers must be used. With the feedback provided by the suggestion frame, the user will know if his hand is generally in the right position to actuate a certain key by checking whether the symbols appearing in the suggestion frame are those associated with the key he intends to strike. The user's need to focus his attention on the keyboard is thus eliminated. Simply stated, features such as those provided by the visual cues illustrated in FIGS. 5A and 5B enable the user to assess the position of the candidate input fingers relative to that of the keys.

Figure 6:
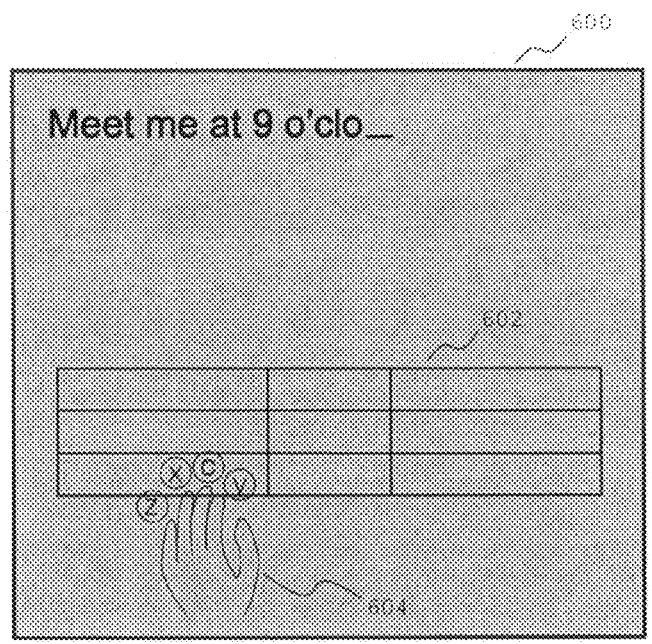
FIG. 6 shows another exemplary embodiment of visual cues for assisting users in operating TFI-enabled keyboards.

Another exemplary embodiment is illustrated in FIG. 6. In accordance with steps 402, 404, 410, 412, and 418 of process 400 (FIG. 4), visual cues may be presented to a user as shown in FIG. 6 by means of displaying reduced representations of some key regions and of a user's input objects, along with candidate input symbols or functions corresponding to those input objects. In FIG. 6, output screen 600 displays a reduced representation, or outline, 602 of a QWERTY keyboard, such as keyboard 200 of FIG. 2 or keyboard 300 of FIG. 3, in the lower portion of the screen. In addition, an outline 604 of the user's left typing hand indicating the finger's real-time position is also displayed. To simplify illustration, only the user's left hand is shown. The real-time display of the reduced representations of the key regions and of the input objects may be derived, for example, from a real-time video capture as performed possibly by an optical sensor that constitutes a portion of the input unit that consists also of the above QWERTY keyboard.

Also shown in FIG. 6, the corresponding candidate input symbols "Z", "X", "C", and "V" are displayed on-screen near the tip of the user's left little, ring, middle, and index finger representations, respectively, as the user's left hand approach the lower left key, such as key 202 in FIG. 2 or key region 302 in FIG. 3, that is associated with those letters. Furthermore, the most probable symbol, "C", identified among the candidate input symbols according to step 414 of process 400, is optionally displayed in bold font to indicate highlighting, in accordance with step 416 of process 400. If, instead, the letter "X" were the most probable input symbol, then "X" alone would appear in bold font. Besides displaying input symbols or functions in bold font, other differentiating features for highlighting the most probable input symbol include, but are not limited to: displaying that symbol in italics font, displaying that symbol as flashing or shaded text, and displaying that symbol in a font size different from the remaining candidate input symbols, just to name a few. Alternatively, only the most probable input symbol "C" may be shown near the tip of the user's finger representations as a manner of highlighting the most probable input symbol. The respective alphabets appearing near the tip of the input finger representations constitute the user-distinguishable features used in presenting the candidate input symbols to the user.

Figure 7:
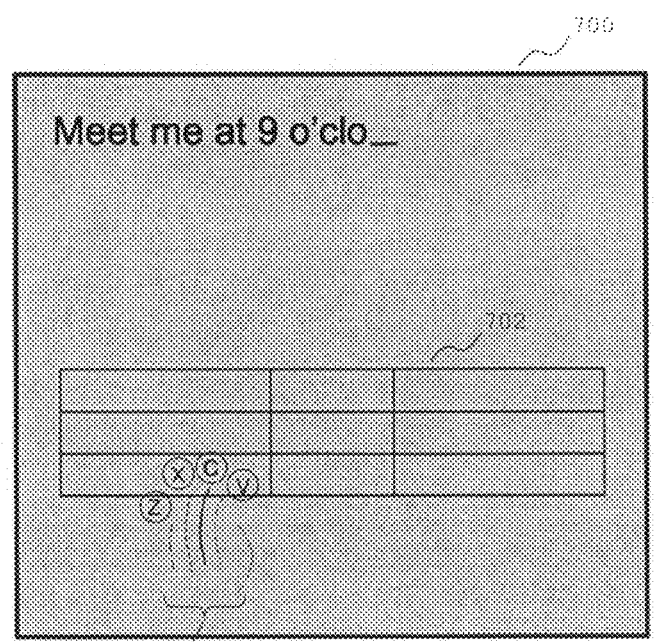
FIG. 7 shows a variation of the exemplary embodiment of FIG. 6.

In an embodiment similar to that illustrated in FIG. 6, a user's input fingers may be represented using lines, with one line per finger, as shown in FIG. 7. An output screen 700 in FIG. 7 displays a reduced representation, or outline, 702 of a QWERTY keyboard, such as keyboard 200 of FIG. 2 or keyboard 300 of FIG. 3, in the lower portion of the screen. In accordance with step 418 of process 400 (FIG. 4), a reduced representation of a user's left typing hand also appears on screen 700, in which the hand's fingers are represented by five lines 704. Based on FIG. 7, the candidate input objects are the user's little, ring, middle, and index fingers on the user's left hand, as detected and identified in steps 402 and 404, respectively, of process 400. For simplicity of illustration, only the user's left hand is shown.

To assist the user in differentiating his various finger representations, user-distinguishable features such as various colors, shapes, line widths, line types, etc. may be applied to the finger representations 704. As shown in FIG. 7, the representations 704 of the input fingers may be differentiated from one another via the various line types. Furthermore, the most probable input finger, the left middle finger, identified among the candidate input fingers according step 406 of process 400, may be optionally displayed with a thick solid line to indicate highlighting, in accordance with step 408 of process 400. If, instead, the left ring finger were the most probable input finger, then that finger alone would be represented with a thick solid line. Besides representing input fingers as thick solid lines, other differentiating features for highlighting the most probable input finger include, but are not limited to: representing that finger as a line of certain color, representing that finger as a line of certain type, representing that finger as a line of certain width, and representing that finger as a flashing line, just to name a few.

Additionally, performing the steps 410 and 412 of process 400 enables the corresponding candidate input symbols "Z", "X", "C", and "V" to be optionally displayed on-screen near the tip of the user's left little, ring, middle, and index finger representations, respectively, as shown in FIG. 7, as the user's left hand approach the lower left key, such as key 202 in FIG. 2 or key region 302 in FIG. 3, that is associated with those letters. Furthermore, the most probable symbol, "C", identified among the candidate input symbols according to step 414 of process 400, is optionally displayed in bold font to indicate highlighting, in accordance with step 416 of process 400. If, instead, the letter "X" were the most probable input symbol, then "X" alone would alone appear in bold font. Besides displaying input symbols or functions in bold font, other differentiating features for highlighting the most probable input symbol include, but are not limited to: displaying that symbol in italics font, displaying that symbol as flashing or shaded text, and displaying that symbol in a font size different from the remaining candidate input symbols, just to name a few. Alternatively, only the most probable input symbol "C" may be shown near the tip of the user's finger representations as a mean of highlighting the most probable input symbol. The respective alphabets appearing near the tip of the input finger representations constitute the user-distinguishable features used in presenting the candidate input symbols to the user.

Figure 8:
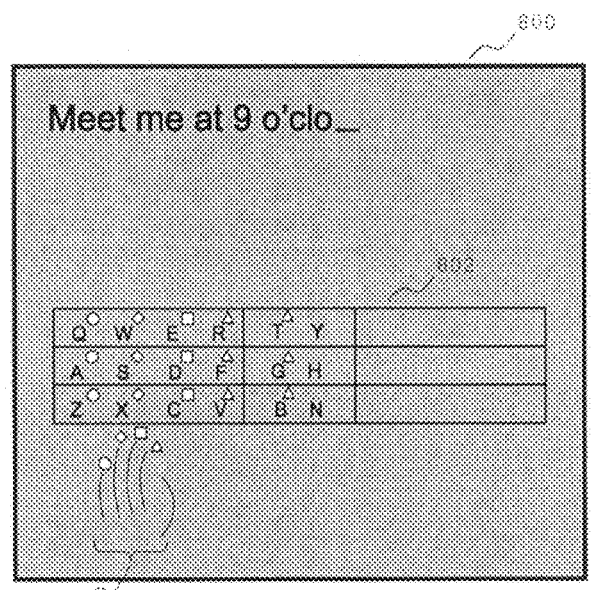
FIG. 8 shows a further exemplary embodiment of visual cues for assisting users in operating TFI-enabled keyboards.

In a further exemplary embodiment depicted in FIG. 8, visual cues presented to a user have user-distinguishable features applied to the input symbols or functions associated with key regions. In accordance with step 418 of process 400 (FIG. 4), an output screen 800 in FIG. 8 displays a reduced representation 802 of a QWERTY keyboard, such as keyboard 200 of FIG. 2 or keyboard 300 of FIG. 3, in the lower portion of the screen. Each key region in the reduced keyboard representation 802 is labeled with its associated input symbols or functions. The individual input symbol or function labels are denoted, as shown in FIG. 8, with a geometry shape such as a circle, diamond, square, or triangle in its upper right-hand corner. These geometric shapes, or user-distinguishable features, are used to indicate the correspondence of the input symbols or functions to their respective input objects. For instance, all input symbols or functions corresponding to the left index finger are denoted with a triangle. Similarly, all input symbols or functions corresponding to the left middle finger are denoted with a square. Likewise, all input symbols or functions corresponding to the left ring finger and the left little finger are denoted, respectively, with a diamond and a circle. For simplicity of illustration, only input symbols corresponding to the user's left-hand fingers are shown in FIG. 8. It is understood that input symbols corresponding to the user's right-hand fingers may be similarly shown in FIG. 8 as well.

Also in accordance with step 418 of process 400, a reduced representation 804 of the input fingers of the user's left hand may be optionally displayed on the screen 800 to further illustrate the correspondence between the input fingers and their respective input symbols or functions. As shown in FIG. 8, the finger representations 804 are denoted in the same manner as their corresponding input symbols or functions. For example, the left middle finger in the finger representations 804 is denoted with a square, just as the input symbols 'E', 'D', and 'C' in the keyboard representation 802 that correspond to this finger. The position of the reduced finger representations 804 on screen 800 may be fixed so that the finger representations 804 merely serve as a key or legend for the user-distinguishable features. Alternatively, the position of the finger representations 804 on screen 800 may be dynamic so that it indicates the real-time position of the input fingers relative to that of the keyboard. For simplicity of illustration, only the reduced representations of the user's left-hand fingers are shown in FIG. 8. It is understood that a representation of the user's right-hand fingers may be similar shown in FIG. 8 as well.

Besides geometric shapes, numerous other user-distinguishable features exist for presenting input objects, input symbols or functions, or the correspondence between input objects and their respective symbols or functions to users. For example, instead of using geometric shapes, different colors may be applied to the input symbols or functions and, optionally, the input objects (if shown) in FIG. 8. All input symbols or functions corresponding to the same input object may be displayed in the same color.

Figure 9:
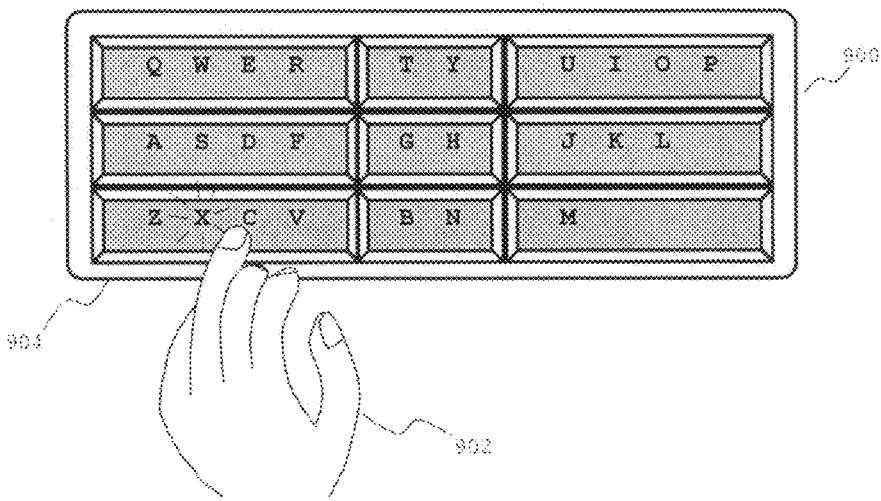
FIG. 9 illustrates a TFI-enabled QWERTY keyboard in which each key is equipped with an Organic Light-Emitting Diode (OLED) display that can be configured to display any symbol or icon at any time.

On keyboards capable of displaying context information on the fly, such as those having keys simulated on touch screens or those having a standalone Organic Light-Emitting Diode (OLED) display embedded in each key, visual cues may be built into the keys themselves. Illustrated in FIG. 9 is a TFI-enabled QWERTY keyboard 900, which is similar to keyboard 200 of FIG. 2 except that at the top of each key is an OLED display that can be configured to display any symbol or icon at any time. FIG. 9 also depicts a user's left hand 902 about to strike the lower left key 904, having associated candidate input symbols "Z", "X", "C", and "V", with its ring finger extended to input the letter "X". In response to detecting the ring finger about to actuate key 904, key 904 may be configured (in accordance with steps 402, 404, 406, 410, 412, 414, and 416 of process 400, FIG. 4) to flash the symbol "X" as a visual cue to the user. Besides flashing the most probable input symbol, other differentiating features for highlighting the most probable input symbol include, but are not limited to: displaying that symbol in bold and/or italics font, displaying that symbol as shaded text, and displaying that symbol in a color or font size different from the remaining candidate input symbols, just to name a few. Alternatively, all other symbols besides the most probable input symbol may be removed from the OLED display of the candidate key region as a means of highlighting the most probable input symbol.

With continuing reference to FIG. 9, the input symbols or functions shown in the OLED displays of the associated keys may be optionally color-coded to reflect the relationship between input symbols or functions and their corresponding input objects, as described in the exemplary embodiment with reference to FIG. 8. For example, in FIG. 9, the symbols 'Q', 'A', and 'Z' that are actuated by the user's left little finger may be shown using a single color, such as yellow. Similarly, the symbols 'W', 'S', and 'X' that are actuated by the user's left ring finger may be shown using another color, such as green. Thus, all symbols corresponding to the same input object may be shown with a unique color. The set of unique colors constitute part of the user-distinguishable features used in presenting the candidate input symbols to the user.

Numerous other exemplary embodiments for visual cues exist. In one such embodiment, visual cues consist of a series of Light Emitting Diodes (LEDs) of various colors, one color representing a candidate input object, such as a user's finger. For example, LEDs of the colors red, blue, green, and yellow may be used, respectively, to represent a user's right index, middle, ring, and little finger such that an LED is normally off but lighted only when its represented candidate input object is detected and identified, according to steps 402 and 404 of process 400 (FIG. 4). The respective colors of the LEDs constitute the user-distinguishable features used in presenting the candidate input objects to the user. Other user-distinguishable features may include, but are not limited to, the size, shape, and brightness of the LEDs, just to name a few. Additionally, the most probable input object (or finger), if optionally identified in step 406 of process 400, may be highlighted in accordance with step 408 by flashing the representing LED. For instance, if the right middle finger is identified as the most probable input object, then the blue LED is flashed.

Besides visual effects, audio effects may be used to assist users in determining whether they are actuating, or about to actuate, a key region with the appropriate corresponding object in inputting the desired symbol or function.

In one embodiment of cues utilizing audible features, a TFI-enabled device such as device 100 (FIG. 1A) may emit, through its audio output unit (not shown), a particular sound corresponding to a particular candidate input object as it detects and identifies that object approaching the device to strike a key, in accordance with steps 402 and 404 of process 400 (FIG. 4). A predetermined sound may be optionally emitted to indicate highlighting when a most probable candidate input object is identified, according to steps 406 and 408 of process 400. Thus, if the aforementioned sounds consist of distinct musical notes, the TFI-enabled device may also function as a musical instrument.

Various other audible features, such as audible tones of different loudness, audible tones of different durations, audible tones of different pitch, different audio clips or patterns, etc., may be employed as user-distinguishable features for the purpose of providing users with audible cues. Additionally, the TFI-enabled data input device may employ verbal cuing such that it announces the symbol or function being input by the user.

Audible features may be combined with visual features, such as those described with reference to FIGS. 5-9, in a multimodal approach to providing users with cues that assist them in accurately and efficiently operating a TFI-enabled device. Furthermore, users may be given the choice of selecting from the various approaches.

While the present invention has been described above in terms of specific embodiments with reference to the accompanying drawings, it is to be understood that the invention is not intended to be confined or limited to those precise embodiments disclosed herein. On the contrary, the present invention is intended to cover various structures and modifications. It should be clearly understood that many variations and/or modifications of the basic inventive concepts herein taught, which may appear to those skilled in the pertinent art, will still fall within the spirit and scope of the present invention. All such changes and modifications are intended to be included within the scope of the invention as defined by the following claims.

What is claimed is:

1. A data entry device having at least one output unit and a virtual input unit having a plurality of virtual key regions on a surface having no mechanical or touch-sensitive key structures, the device configured to:
   associate a group of symbols or a group of functions with each of a single virtual key region from the plurality of virtual key regions;
   define a group of unique input objects with each unique input object having a defining feature that differentiates it from the other unique input objects in the group;
   assign to each of the single symbols from the group of symbols or each of the single functions from the group of functions associated with each of the virtual key regions a unique input object from the group of unique input objects;
   an optical sensor to identify a virtual key region about to be actuated by an input object to define a candidate key region;
   identify and detect with the optical sensor the most probable input object from the group of unique input objects about to actuate the candidate key region;
   determine the most probable symbol or function based on the identity of the most probable input object and the candidate key region;
   display via the output unit the group of symbols, or a representation of the group of functions, associated with the candidate key region;
   apply a visually-perceptible emphasis to the most probable symbol or function to differentiate it from the other symbols or functions in their respective groups;
   display via the output unit a visually-perceptible representation of the group of input objects; and
   apply a visually-perceptible emphasis to the visually-perceptible representation of the most likely input object to differentiate it from the visually-perceptible representations of other input objects in the group of input objects.

2. The device of claim 1 wherein the step of identifying the most probable input object comprises:
   detecting candidate input objects positioned proximate the candidate key region; and
   determining the candidate input object most proximate the candidate key region.

3. The device of claim 2 further comprising displaying a representation of the candidate input objects proximate a representation of the key regions to provide real-time information on the position of the candidate input objects relative to that of the key regions.

4. The device of claim 1 wherein the optical sensor comprises at least two cameras.

5. The device of claim 1 wherein the visually perceptible emphasis is selected from the group consisting of: bold font, italics font, flashing text, shaded text, displaying the most probable input symbol or function in a font different from the remaining input symbols or functions in the group, and displaying the most probable input symbol or function while the remaining input symbols or functions from the group are not displayed.

6. The device of claim 1 wherein the visually perceptible emphasis is selected from the group consisting of: displaying a certain color, displaying an object of a certain size, displaying a certain shape, flashing an LED of certain brightness, representing the most probable input object as a line of certain color, representing the most probable input object as a line of certain type, representing the most probable input object as a line of certain width, and representing the most probable input object as a flashing line.

7. The method of claim 1, further comprising applying an audibly-perceptible emphasis to the most probably symbol or function.

8. The method of claim 7 wherein the audibly-perceptible feature is selected from the group consisting of: emitting audio tones of certain loudness, emitting audio tones of certain pitch, emitting audio tones of certain duration, emitting certain musical notes, and rendering certain audio clips or patterns.

9. The device of claim 1 wherein the input objects are fingers.

10. The device of claim 1 wherein the visually-perceptible emphasis is configurable by the user.

11. The device of claim 1 wherein the data entry device is a computing device.

12. The method of claim 7 wherein the electronic device is a musical device.

13. The device of claim 1 further configured to:
provide in the output unit a visual representation of the input object-to-symbol or input object-to-function assignments.

14. A data entry device having at least one output unit and a virtual input unit having a plurality of virtual key regions configured to:
associate a group of symbols with each of a single virtual key region from the plurality of virtual key regions;
assign to each finger of a user having a group of fingers a single symbol from the group of symbols;
an optical sensor positioned remote from the virtual key region to identify a virtual key region about to be actuated by the user to define a candidate key region;
identify and detect with the optical sensor a most probable finger that is about to actuate the candidate key region;
determine the most probable symbol based on the identity of the most probable finger and the candidate key region;
display via the output unit the group of symbols associated with the candidate key region;
apply a visually-perceptible emphasis to the most probable symbol to differentiate it from the display of the other symbols in the group of symbols;
display via the output unit a visually-perceptible representation of the group of fingers; and
apply a visually-perceptible emphasis to the most probable finger to differentiate it from other fingers in the group of fingers.

15. The device of claim 14 wherein the optical sensor is a camera.

16. The device of claim 15 wherein the optical sensor is at least two cameras.

17. The device of claim 14 wherein the visually-perceptible emphasis is selected from the group consisting of: bold font, italics font, flashing text, shaded text, displaying the most probable symbol in a font different from the other symbols in the group, and displaying the most probable symbol while the other symbols of the group are not displayed.

18. The device of claim 14 wherein the group of fingers includes fingers of a left hand, fingers or a right hand, fingers of both a left hand and a right hand.

* * * * *